United States Patent
Wang

[11] Patent Number: 6,097,007
[45] Date of Patent: Aug. 1, 2000

[54] AQUARIUM WATER TEMPERATURE CONTROLLER

[75] Inventor: Yulis Wang, Taipei, Taiwan

[73] Assignee: Eiko Electric Products Corp., Taipei, Taiwan

[21] Appl. No.: 09/282,196

[22] Filed: Mar. 31, 1999

[51] Int. Cl.[7] .................................................. H05B 1/02
[52] U.S. Cl. ...................... 219/501; 497/523; 497/499; 392/408
[58] Field of Search .................................. 219/497, 501, 219/505, 523–525, 499; 392/498, 497, 447, 448, 502

[56] References Cited

U.S. PATENT DOCUMENTS

| | | | |
|---|---|---|---|
| 4,124,793 | 11/1978 | Colman | 219/523 |
| 5,392,380 | 2/1995 | Tsai | 392/498 |
| 5,568,587 | 10/1996 | Marioni | 219/523 |
| 5,834,741 | 11/1998 | Tseng | 219/506 |

*Primary Examiner*—Mark Paschall
*Attorney, Agent, or Firm*—Dougherty & Troxell

[57] ABSTRACT

An aquarium water temperature controller, which includes a glass casing, an inner tube mounted within the glass casing, an electric heating element mounted in the glass casing and connected to the inner tube, and a circuit board mounted in the inner tube and electrically connected to the electric heating element, wherein the circuit board includes a bridge circuit having a thermistor, a comparator circuit controlled by the bridge circuit to output high/low potential subject to temperature detecting status of the thermistor, a bias voltage generating circuit connected to the bridge circuit and the comparator circuit, an analog switching circuit controlled by the bias voltage generating circuit, a thyristor, and a voltage following circuit and an integrating circuit controlled by the analog switching circuit to turn on the thyristor when the bridge circuit outputs low potential, or to turn off the thyristor when the bridge circuit outputs high potential. The thermistor and the thyristor are connected with a respective heat conductive strip member having wing portions disposed in contact with the inside wall of the glass casing.

1 Claim, 3 Drawing Sheets

AQUARIUM WATER TEMPERATURE CONTROLLER

BACKGROUND OF THE INVENTION

The present invention relates to water temperature controllers, and more specifically to an aquarium water temperature controller which accurately detects the water temperature of the aquarium, and automatically controls the water temperature.

The water temperature of an aquarium may vary with the ambient temperature. In order to control the water temperature of an aquarium, a water temperature detector with an electric heater is commonly used. Further, the water temperature of an aquarium must be controlled within a suitable range subject to the type of living fish kept in the aquarium. For example, fresh water fish require relatively higher temperature, and sea water fish require relatively lower temperature. A variety of water temperature controllers have been disclosed for this purpose. However, the water temperature detector of these conventional water temperature controllers is less sensitive, and tends to be affected by the temperature of the other components in the circuit.

SUMMARY OF THE INVENTION

The present invention has been accomplished to provide an aquarium water temperature controller which is highly sensitive and can accurately control the water temperature of the aquarium. According to the present invention, the aquarium water temperature detector comprises a cylindrical glass casing, an insulative inner tube mounted within the cylindrical glass casing, an electric heating element mounted inside the cylindrical glass casing and connected to one end of the insulative inner tube, and a circuit board mounted inside the insulative inner tube and electrically connected to the electric heating element, wherein the circuit board comprises a bridge circuit having a thermistor, a comparator circuit controlled by the bridge circuit to output high/low potential subject to temperature detecting status of the thermistor, a bias voltage generating circuit connected to the bridge circuit and the comparator circuit, an analog switching circuit controlled by the bias voltage generating circuit, a thyristor, a voltage following circuit and an integrating circuit controlled by the analog switching circuit to turn on the thyristor when the bridge circuit outputs low potential, or to turn off the thyristor when the bridge circuit outputs high potential, a first heat conductive strip member connected to the thermistor, and a second heat conductive strip member connected to the thyristor, the first heat conductive strip member and the second heat conductive strip member each having wing portions extended out of the insulative inner tube and retained in close contact with the inside wall of the cylindrical glass casing.

DETAILED DESCRIPTION OF THE PREFERRED EMBODIMENT

Figure 1:
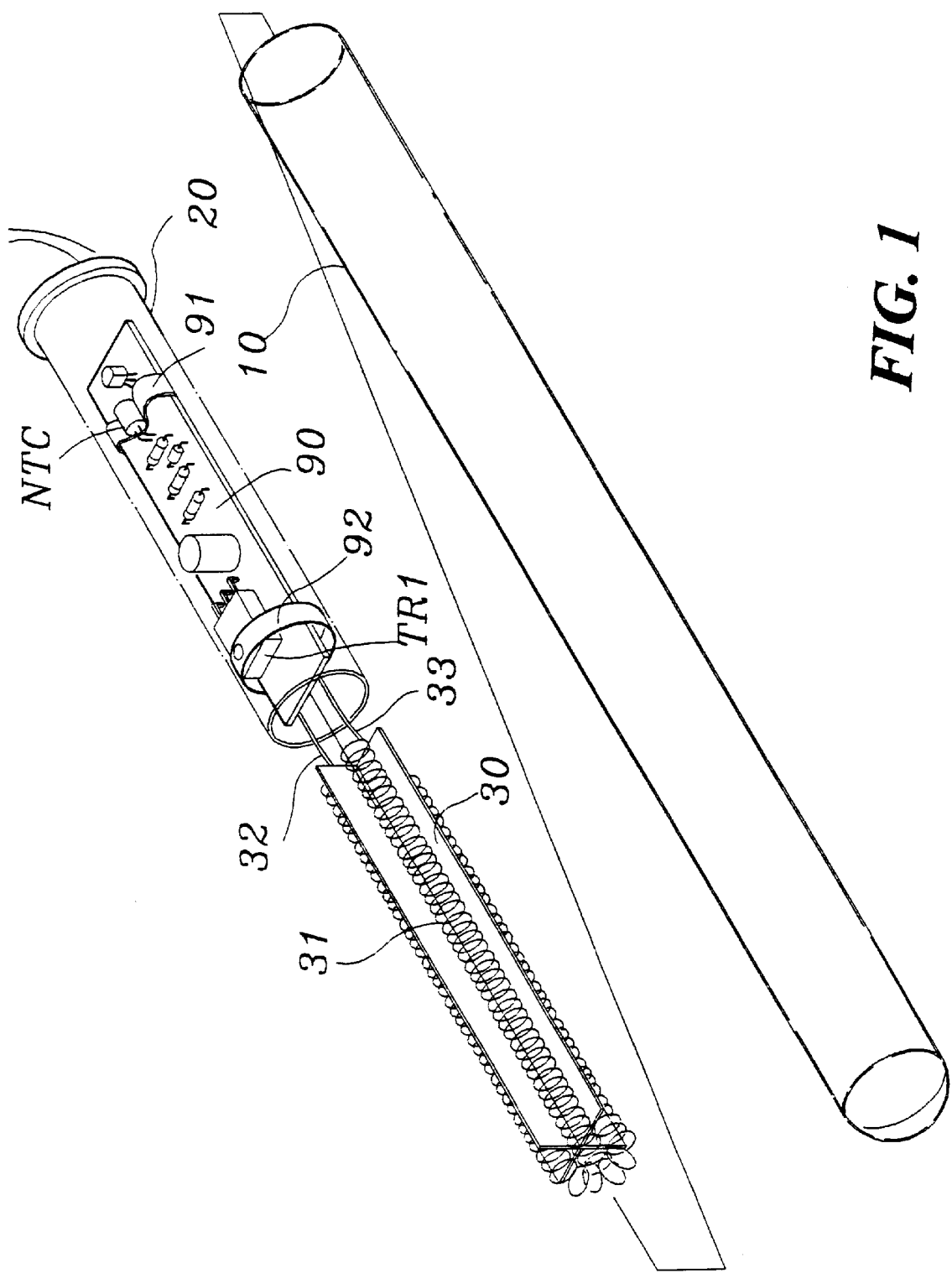
FIG. 1 is an exploded view of an aquarium water temperature controller according to the present invention.
Figure 2:
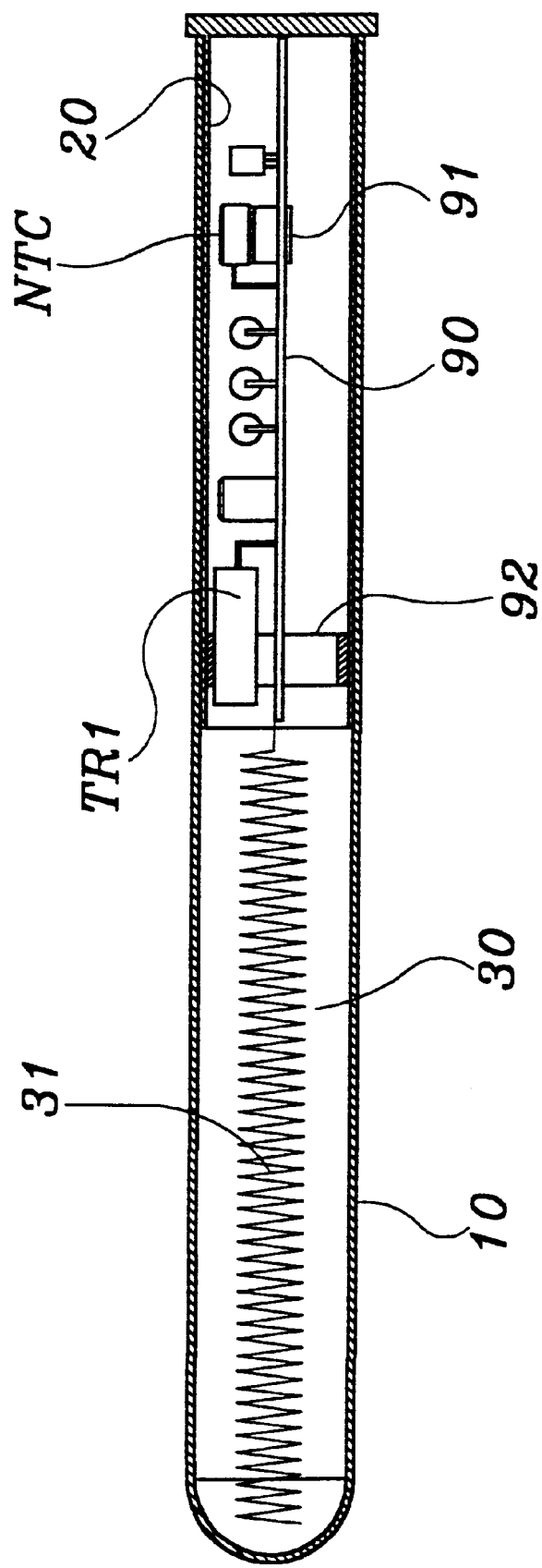
FIG. 2 is a sectional assembly view of the aquarium water temperature controller shown in FIG. 1.

Referring to FIGS. 1 and 2, a water temperature controller for an aquarium in accordance with the present invention is generally comprised of a cylindrical glass casing 10, a plastic inner tube 20 mounted within the cylindrical glass casing 10, an elongated ceramic support 30 mounted inside the cylindrical glass casing 10 and connected to one end of the plastic inner tube 20, an electric heating coil 31 mounted on the ceramic support 30, and a circuit board 90 mounted inside the plastic inner tube 20. The two opposite lead wires 32 and 33 of the electric heating coil 31 are respectively connected to the circuit board 90. The circuit board 90 includes a temperature detecting circuit, which is comprised of a thermistor NTC, a silicon-controlled thyristor TRI, a first heat conductive strip member 91 fastened to the thermistor NTC, and a second heat conductive strip member 92 fastened to the silicon-controlled thyristor TRI. The first heat conductive strip member 91 and the second heat conductive strip member 92 each have two wing portions at two opposite ends respectively extended out of the plastic inner tube 20. When the plastic inner tube 20 is inserted into the cylindrical glass casing 10, the tension of the material of the heat conductive strip members 91 and 92 forces the wing portions of the first heat conductive strip member 91 and the second heat conductive strip member 92 into contact with the inside wall of the cylindrical glass casing 10.

Figure 3:
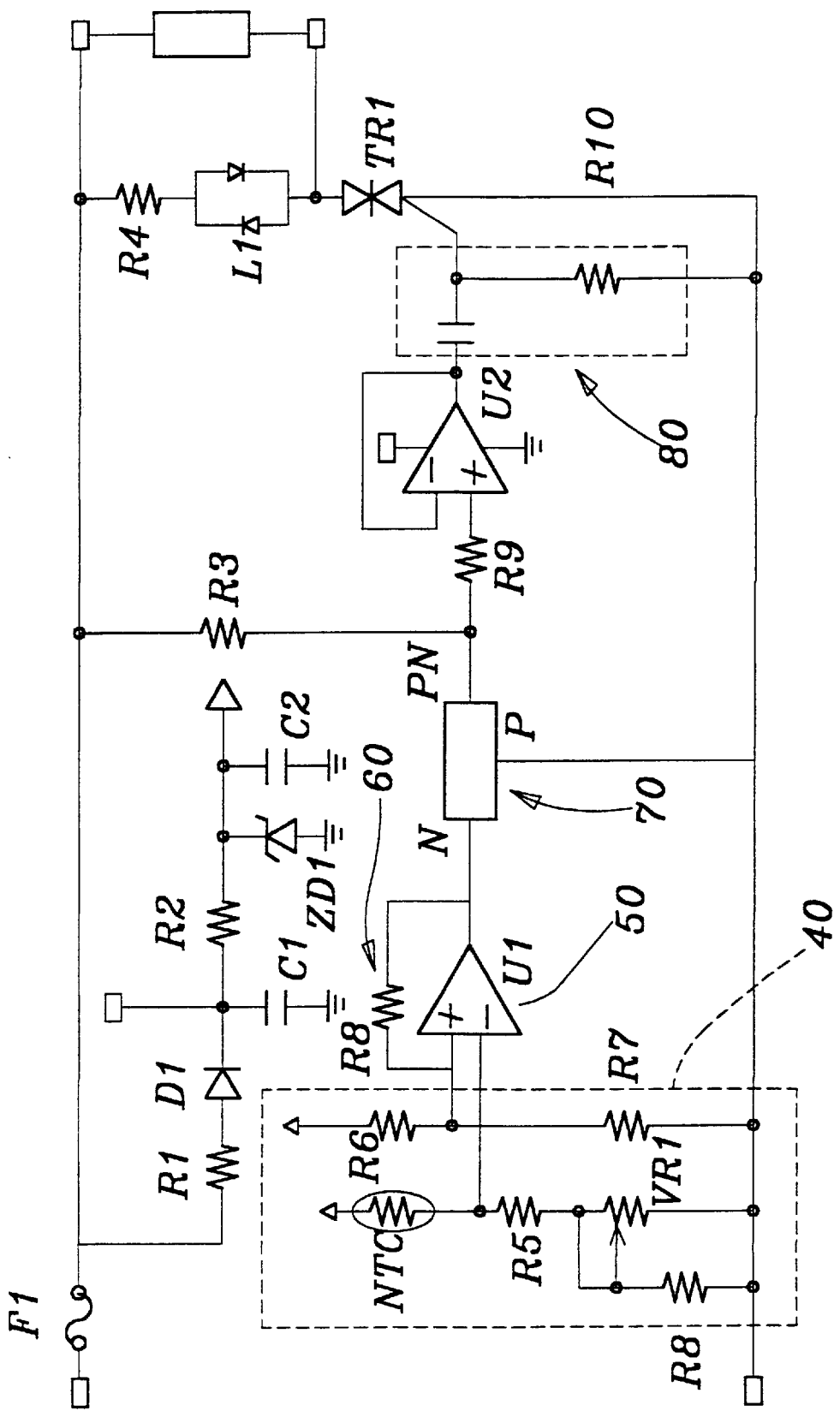
FIG. 3 is a circuit diagram of the present invention.

Referring to FIG. 3, the thermistor NTC is a negative temperature coefficient thermistor, and forms with $VR_1$, $R_x$, $R_5$, $R_6$ and $R_7$ a bridge circuit 40, enabling:

$$\frac{NTC}{R_5 + \left(\frac{1}{\frac{1}{VR_1} + \frac{1}{R_X}}\right)} = \frac{R_6}{R_7}$$

in which U1 is a comparator 50, when:

$$\frac{NTC}{R_5 + \left(\frac{1}{\frac{1}{VR_1} + \frac{1}{R_X}}\right)} < \frac{R_6}{R_7}$$

thus impedance of NTC drops, temperature rises, and $U_1$ outputs low potential.

On the contrary, when:

$$\frac{NTC}{R_5 + \left(\frac{1}{\frac{1}{VR_1} + \frac{1}{R_X}}\right)} > \frac{R_6}{R_7}$$

thus $U_1$ outputs high potential.

R8 is a bias voltage generating circuit. When $U_1$ outputs low potential, the bridge circuit 40 becomes:

$$\frac{NTC}{R_5 + \left(\frac{1}{\frac{1}{VR_1} + \frac{1}{R_X}}\right)} = \frac{R_6}{\frac{1}{\frac{1}{R_7} + \frac{1}{R_8}}}$$

When $U_1$ outputs high potential, the bridge circuit 40 becomes:

$$\frac{NTC}{R_5 + \left(\dfrac{1}{\dfrac{1}{VR_1} + \dfrac{1}{R_X}}\right)} = \dfrac{\dfrac{1}{\dfrac{1}{R_6} + \dfrac{1}{R_8}}}{R_7}$$

forming a trigger circuit.

$DB_2$ is an analog switching circuit 70. When $U_1$ outputs high potential, AC signal is rectified to square wave, and then sent through an integrating circuit 82, which is formed of $C_3$ and $R_{10}$, to drive the silicon-controlled thyristor TRI. On the contrary, when $U_1$ outputs low potential, voltage following circuit $U_2$ outputs square wave ±0.6 V, which is insufficient to drive the silicon-controlled thyristor TRI. Therefore, the silicon-controlled thyristor TRI is turned on when temperature drops below a predetermined low value, or turned off when temperature surpasses a predetermined high value.

The first heat conductive strip member 91 and second heat conductive strip member 92 are respectively fastened to the thermistor NTC and the silicon-controlled thyristor TRI, the heat conductive strip members 91 and 92 release noise temperature from the other components at the circuit board 90 to prevent an interference. Furthermore, because the wing portions of the heat conductive strip members 91 and 92 are forced by respective tension into close contact with the inside wall of the cylindrical glass casing, water temperature can be sensitively and accurately detected.

What the invention claimed is:

1. An aquarium water temperature controller comprising a cylindrical glass casing, a plastic inner tube mounted within said cylindrical glass casing, an electric heating element mounted inside said cylindrical glass casing and connected to lead wires at one end of said plastic inner tube, and a circuit board mounted inside said plastic inner tube and electrically connected to said electric heating element, wherein said circuit board comprises a bridge circuit having a thermistor, a comparator circuit controlled by said bridge circuit to output high/low potential subject to temperature detecting status of said thermistor, a bias voltage generating circuit connected to said bridge circuit and said comparator circuit, an analog switching circuit controlled by said bias voltage generating circuit, a thyristor, a voltage following circuit and an integrating circuit controlled by said analog switching circuit to turn on said thyristor when said bridge circuit outputs high potential, a first heat conductive strip member connected to said thermistor, and a second heat conductive strip member connected to said thyristor, said first heat conductive strip member and said second heat conductive strip member each having wing portions extended out of said plastic inner tube and retained in close contact with the inside wall of said cylindrical glass casing, wherein said heat conductive strip members release noise temperature from the other components at the circuit board to prevent interference.

* * * * *